United States Patent
Col et al.

(10) Patent No.: US 6,209,082 B1
(45) Date of Patent: Mar. 27, 2001

(54) APPARATUS AND METHOD FOR OPTIMIZING EXECUTION OF PUSH ALL/POP ALL INSTRUCTIONS

(75) Inventors: Gerard Col; G. Glenn Henry; Arturo Martin-de-Nicolas, all of Austin, TX (US)

(73) Assignee: IP First, L.L.C., Fremont, CA (US)

( * ) Notice: Subject to any disclaimer, the term of this patent is extended or adjusted under 35 U.S.C. 154(b) by 0 days.

(21) Appl. No.: 09/193,278

(22) Filed: Nov. 17, 1998

(51) Int. Cl.[7] .............................. G06F 9/312; G06F 9/38
(52) U.S. Cl. ........................ 712/225; 712/226; 712/228
(58) Field of Search .................................. 712/202, 210, 712/219, 225, 226, 228

(56) References Cited

U.S. PATENT DOCUMENTS

| | | | |
|---|---|---|---|
| 5,142,635 | 8/1992 | Saini | 712/225 |
| 5,416,911 | 5/1995 | Dinkjian et al. | 712/225 |
| 5,481,734 | 1/1996 | Yoshida | 712/225 |
| 5,497,468 | 3/1996 | Tani et al. | 712/225 |
| 5,687,336 | 11/1997 | Shen et al. | 712/202 |

OTHER PUBLICATIONS

Farrell et al., *Dynamic Boundary Algorithm for a Data Movement Mechanism*, IBM Technical Disclosure Bulletin, vol. 27, No. 1A, Jun. 1984, pp. 95–100.

Intel, *Intel Architecture Software Developer's Manual, vol. 2: Instruction Set Reference*, 1997, pp. 3–354 to 3–355, and 3–388 to 3–389.

*Primary Examiner*—Richard L. Ellis
(74) *Attorney, Agent, or Firm*—Richard K. Huffman; James W. Huffman

(57) ABSTRACT

An apparatus and method are provided for executing a push all/pop all instruction in a pipeline microprocessor. The apparatus includes an instruction buffer and a translator. The instruction buffer provides the push all/pop all instruction, directing the microprocessor to store/retrieve multiple operands to/from a stack. The translator generates a sequence of micro instructions to store/retrieve the multiple operands. Accesses to a pair of operands which are together aligned are combined into a single access.

21 Claims, 6 Drawing Sheets

Control Transfer Between Two Subroutines Via Stack Structure

FIG. 7

*Optimally Sequenced PUSH ALL/POP ALL Execution* 700

| Cycle | Stack Pointer | Translate | Register |
|---|---|---|---|
| 1 | F0 | *** | *** |
| 2 | F0 | PUSHAD | *** |
| 3 | F0 | -- | PUSH2 EAX,ECX |
| 4 | E8 | -- | PUSH2 EDX,EBX |
| 5 | E0 | -- | PUSH2 ESP,EBP |
| 6 | D8 | *** | PUSH2 ESI,EDI |
| 7 | D0 | *** | *** |

- two operands accessed in a single cycle (cycle 3: PUSH2 EAX,ECX)
- 4 cycles to access stack

| Cycle | Stack Pointer | Translate | Register |
|---|---|---|---|
| 12 | F4 | PUSHAD | *** |
| 13 | F4 | -- | PUSH EAX |
| 14 | F0 | -- | PUSH2 ECX,EDX |
| 15 | E8 | -- | PUSH2 EBX,ESP |
| 16 | E0 | -- | PUSH2 EBP,ESI |
| 17 | D8 | *** | PUSH EDI |
| 18 | D4 | *** | *** |

- two operands accessed in a single cycle (cycle 14: PUSH2 ECX,EDX)
- 5 cycles to access stack

| Cycle | Stack Pointer | Translate | Register |
|---|---|---|---|
| 22 | D0 | POPAD | *** |
| 23 | D0 | -- | POP2 EDI,ESI |
| 24 | D8 | -- | POP2 EBP,ESP |
| 25 | E0 | -- | POP2 EBX,EDX |
| 26 | E8 | *** | POP2 ECX,EAX |
| 27 | F0 | *** | *** |

- 4 cycles to access stack

| Cycle | Stack Pointer | Translate | Register |
|---|---|---|---|
| 32 | D4 | POPAD | *** |
| 33 | D4 | -- | POP EDI |
| 34 | D8 | -- | POP2 ESI,EBP |
| 35 | E0 | -- | POP2 ESP,EBX |
| 36 | E8 | -- | POP2 EDX,ECX |
| 37 | F0 | *** | POP EAX |
| 38 | F4 | *** | *** |

- 5 cycles to access stack

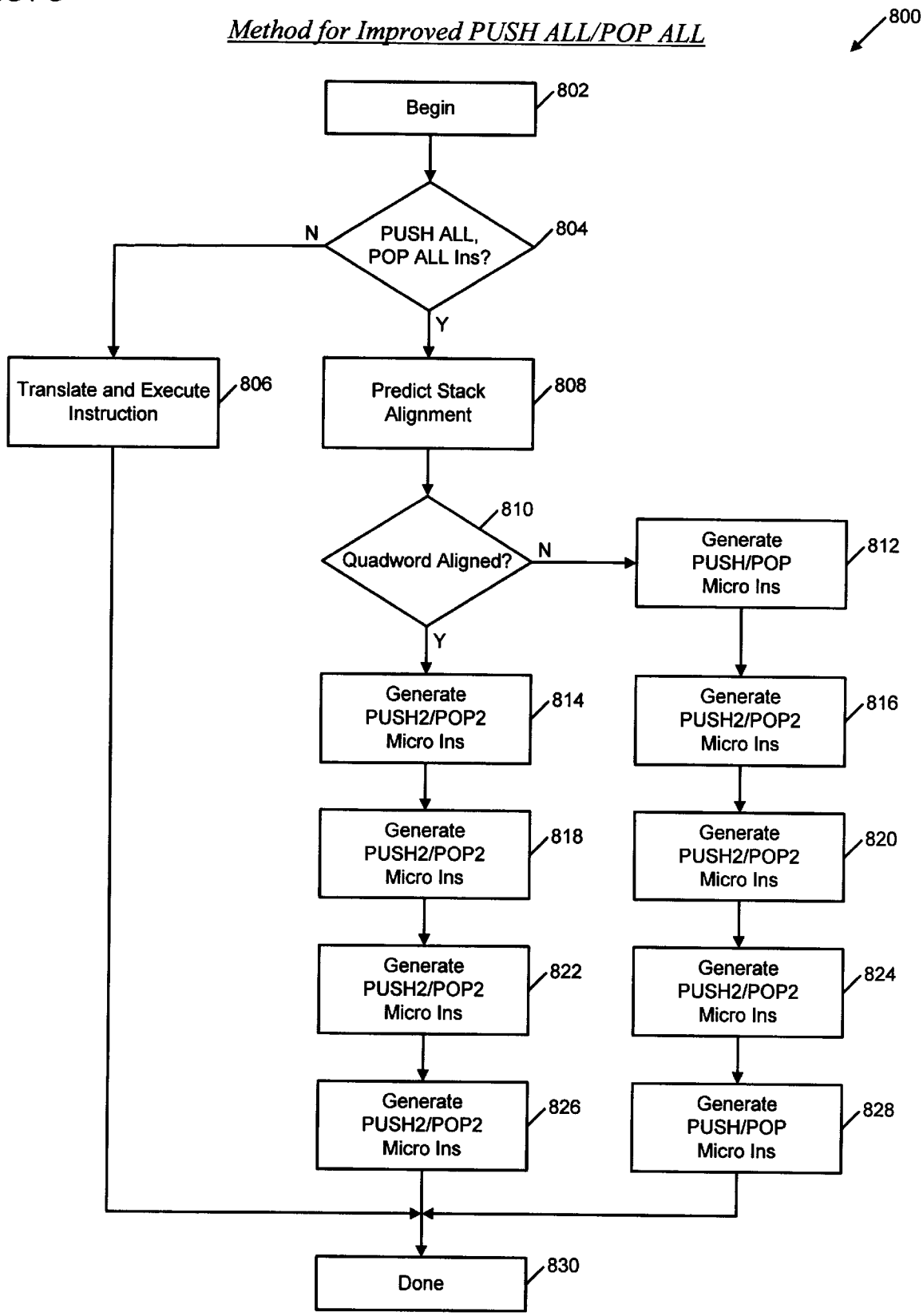

APPARATUS AND METHOD FOR OPTIMIZING EXECUTION OF PUSH ALL/POP ALL INSTRUCTIONS

BACKGROUND OF THE INVENTION

1. Field of the Invention

This invention relates in general to the field of data processing in computers, and more particularly to an apparatus and method for performing push all/pop all stack access operations.

2. Description of the Related Art

An application program for execution on a microprocessor typically is divided into a number of subroutines. Each subroutine performs a particular function such as retrieving contents of an address in memory, adding two operands together, or outputting an operand to an address mapped to, say, a video display device. And, in today's desktop computer systems, applications and their constituent subroutines are designed so as to give the impression that they are executing at the same time on the microprocessor. For example, an operator desires to immediately view on a video monitor what is being input to the computer from a keyboard. Although a subroutine for reading keystrokes on the keyboard does not run on the microprocessor at the same instant as a subroutine to display characters on the video monitor, the two subroutines are designed to time share resources in the microprocessor so that it appears to the operator that the two events, input and display, happen simultaneously.

Additionally, a significant number of subroutines that are executed on a desktop computer system utilize the same microprocessor resources, such as general purpose registers in the microprocessor. Because most subroutines are designed to time share these resources, microprocessors provide certain instructions and associated logic to insure that transfer of microprocessor control from one subroutine to the next is convenient and effective.

Most often, subroutines utilize a stack structure in memory to temporarily store the contents of their associated registers prior to transferring control of the microprocessor. A stack is simply a block of memory at a designated address. Hence, prior to transferring control to Subroutine B, Subroutine A would first copy the contents of all of its working registers to the stack. As a result, Subroutine B is free to use the same registers without corrupting register contents associated with Subroutine A. When control is returned to Subroutine A, it would then retrieve contents of its working registers from the stack and continue execution.

Present day stacks are architecturally configured to store successive operands in adjacent memory locations. Hence, four successive store operations to a stack would result in operands being placed in four adjacent stack addresses. Additionally, three successive stack retrievals would result in operands being retrieved from three adjacent stack addresses. Stack usage is so prevalent today that most microprocessors provide dedicated instructions, i.e., stack access instructions, for storing data in a stack and retrieving data from the stack. One particular pair of stack access instructions is used to store/retrieve all of a microprocessor's general purpose registers to/from the stack. This instructions are commonly known as a push all instructions (PUSHA) and pop all instructions (POPA).

When a push all instruction is executed by a microprocessor, it is decoded by logic in the microprocessor into a sequence of push micro instructions, each push micro instruction directing the microprocessor to store one of the general purpose registers in the stack. A number of push micro instructions are generated equal to the number of general purpose registers. For instance, in an x86-compatible microprocessor, there are eight general purpose registers. Hence, a push all operation would result in the generation and execution of eight push micro instructions, each push micro instruction directing the microprocessor to store a different register. A pop all instruction is similarly executed, with the exception that the operands are retrieved from the stack and placed in all the general purpose registers rather than stored in the stack.

Although a microprocessor's registers are individually stored to or retrieved from the stack by the push/pop micro instructions, the microprocessor does not store/retrieve a number of bytes to/from the stack equal to the size of a general purpose register. Rather, the microprocessor is designed to store/retrieve data in larger-sized blocks. For example, in a typical microprocessor, an instruction to retrieve a 2-byte operand from memory would result in the microprocessor retrieving, say, and 8-byte block of data which contains the 2-byte operand.

For many types of instructions, accessing a larger-sized block of data than what is really required does not impose a burden on microprocessor performance. Yet, microprocessor designers continue to be challenged to increase the overall performance of a design by improving the efficiency of certain fundamental operations. Push all and pop all instructions are ripe for improvement, primarily because these instructions direct the microprocessor to perform multiple accesses to the stack to access multiple operands in adjacent addresses. It is highly probable, then, that a number of the multiple operands would be contained within the same larger-size block of data. Yet to have to repeatedly access the same larger-size block of data to access different operands is inefficient. A given operand in a larger-sized data block may conceivably be accessed a number of times during execution of a push all/pop all instruction. This is because the larger-sized data block, in addition to containing the given operand, contains other operands which are also prescribed for access by the push all/pop all instruction. And, because present day microprocessors do not provide the capability to combine accesses to a group of operands contained within the same larger-sized data block into a single access, the given operand is accessed each time the other operands in the larger-sized data block are accessed by the microprocessor. One skilled in the art will observe from the above that execution of push all/pop all instructions in a present day microprocessor wastes a great deal of valuable execution time.

Therefore, what is needed is a microprocessor which can store/retrieve two operands to/from a stack within a single access.

In addition, what is needed is an apparatus in a microprocessor to perform a push all/pop all operation wherein pairs of operands are accessed in a combined access.

Moreover, what is needed is a method for executing a push all/pop all instruction on a microprocessor that eliminates redundant memory accesses by combining accesses to a group of operands into a single access.

SUMMARY

To address the above-detailed deficiencies, it is an object of the present invention to provide a microprocessor which can access two stack operands a within a single combined access to a stack. Accordingly, in the attainment of the aforementioned object, it is a feature of the present invention to provide a microprocessor for accessing a stack. The microprocessor has an instruction buffer, a translator, and access alignment logic. The instruction buffer execution of the push all instruction or the pop all instruction; ii) estimating a new top of stack address based upon successful execution of the push all instruction or the pop all instruction; and iii) ascertaining alignment of a pair of the multiple operands using the new top of stack address provided by said estimating.

Yet another advantage of the present invention is program control transfers in a microprocessor require less time to complete.

BRIEF DESCRIPTION OF THE DRAWINGS

These and other objects, features, and advantages of the present invention will become better understood with regard to the following description, and accompanying drawings where:

FIG. 7 is a table illustrating execution of push all/pop all instructions by the microprocessor of FIG. 6 for aligned and misaligned access cases.

FIG. 8 is a flow chart illustrating a method according to the present invention for performing push all/pop all operations in a pipeline microprocessor.

DETAILED DESCRIPTION

In view of the above background on techniques used by a microprocessor for accessing multiple operands in a stack, several related art examples will now be described with reference to FIGS. 1 through 5. These examples illustrate how present day techniques for repeatedly accessing a stack structure unnecessarily delay the execution of a application programs. Following this discussion, a detailed description of the present invention will be provided with reference to FIGS. 6 through 8. Use of the present invention allows multiple operands to be accessed in a stack faster and more efficiently by a microprocessor because accesses to operands that are aligned together in memory are combined into a single access which is executed in a single instruction cycle.

Figure 1:
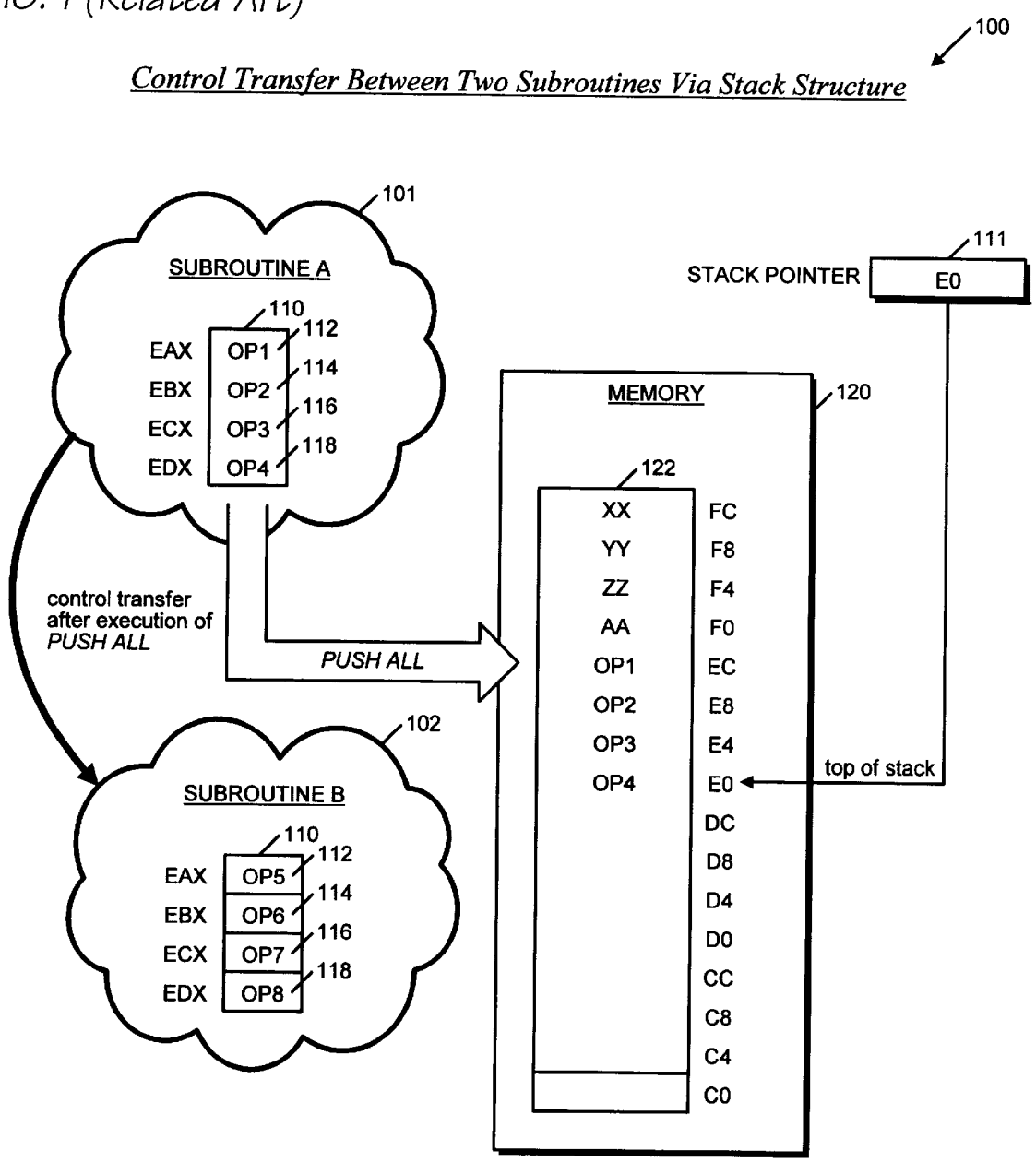
FIG. 1 is a diagram illustrating how software subroutines executing on a microprocessor utilize a stack in memory.

Now referring to FIG. 1, a diagram 100 is presented illustrating how software subroutines executing on a microprocessor utilize a stack 122 in memory 120 for temporary storage of operands. The diagram 100 depicts two subroutines: Subroutine A 101 and Subroutine B 102. The diagram 100 also depicts a register file 110 in the microprocessor which is used upon execution of Subroutine A 101 and also upon execution of Subroutine B 102. The diagram 100 also shows Subroutine A 101 accessing a stack 122 located in memory 120 prior to transferring control of the microprocessor to Subroutine B 102. The diagram 100, in addition, shows a stack pointer register 111, which is used to index locations in the stack 122. The subroutines 101, 102 may exist in the same application program or they may be belong to two different application programs.

In operation, only one software entity can execute on a microprocessor at any given point in time. Software entities are commonly termed by those skilled in the art as subroutines, functions, routines, or procedures. Although only one subroutine can utilize a microprocessor's resources at any given point in time, present day microprocessors provide the capability for many different subroutines to time share the microprocessor's resources. For example, Subroutine A 101 may execute for a designated amount of time, then transfer control to Subroutine B 102. Subroutine B 102 would then execute on the microprocessor following transfer of control from Subroutine A 101. The diagram 100 shows that each of the two subroutines 101, 102 utilizes four 4-byte registers in the microprocessor register file 110: register EAX 112, register EBX 114, register ECX 116, and register EDX 118. Since each of the two subroutines 101, 102 utilizes the same 4-byte registers 112, 114, 116, 118 in the register file 110, Subroutine A 101 must temporarily store contents of its registers 112, 114, 116, 118 prior to transferring control to Subroutine B 102. Four operands are shown in Subroutine A's 4-byte registers 112, 114, 116, 118: OP1 is in register EAX 112, OP2 is in register EBX 114, OP3 is in register ECX 116, and OP4 is in register EDX 118. Contents of these registers 112, 114, 116, 118 are temporarily stored in the stack 122, which is located at a designated address in memory 120. The stack 122 shown in FIG. 2 begins at address C0h and ends at address FFh. Subroutines in application programs also pass operands to one another via the stack 122.

Storing an operand in the stack 122 is known as pushing data on to the stack 122, or pushing the stack 122. A subroutine may also retrieve operands from the stack 122. Retrieval of operands from the stack 122 is known as a stack pop, popping data off of the stack 122, or popping the stack 122. Hence, prior to transferring control to Subroutine B 102, Subroutine A 101 must push registers EAX 112, EBX 114, ECX 116, and EDX 118 on to the stack 122. The x86 instruction set provides instructions to push/pop single operands on the stack 122. These operands may be directly supplied by the instruction, they may reside in a register like those shown in the diagram 100, or they may be in memory 120. In addition, the x86 instruction set provides an instruction, push all/pop all, which is used to push/pop all of the general purpose registers in an x86-compatible microprocessor to/from the stack 122. Because most subroutines use the general purpose registers in a microprocessor, the push all/pop all instruction provides a convenient mechanism to save and retrieve the contents of general purpose registers associated with execution of a particular subroutine prior to transferring control to another subroutine. The diagram depicts execution of a push all instruction by Subroutine A 101 to push the contents of registers EAX 112, EBX 114, ECX 116, and EDX 118 on to the stack 122 prior to transferring control to Subroutine B 102. One skilled in the art will understand that, although only four 4-byte registers 112, 114, 116, 118 are shown in the diagram 100, there are eight general purpose registers in an x86-compatible microprocessor. The x86 push all/pop all instruction pushes/pops all eight of the general purpose registers.

Pushing or popping the stack 122 requires knowledge of where operands are stored within the stack 122. The stack pointer 111 is a register in the microprocessor that contains the address of the top of the stack, i.e., the next available address for use in the stack. Within an x86-compatible microprocessor, when a stack push occurs, the stack pointer 111 is first decremented by the width in bytes of the operand to be pushed, then the operand is written to the stack 122 at the address contained in the stack pointer 111. When a stack pop occurs, the operand is first retrieved from the stack 122 at the address indicated by the stack pointer, then the stack pointer 111 is incremented by the width of the retrieved operand. For instance, at execution of the push all instruction by Subroutine A 101, the stack pointer 111 points to address F0h in memory 120. As the push all instruction is executed, pushing register EAX 112 on to the stack 122 would first cause the stack pointer 111 to be decremented by four bytes to address ECh. OP1 would then be stored in locations ECh-EFh. Next, pushing register EBX 114 on to the stack 122 causes the stack pointer 111 to be decremented to address E8h. OP2 is then stored in locations E8h-EBh. Next, pushing register ECX 116 on to the stack 122 causes the stack pointer 111 to be decremented to address E4h. OP3 is then stored in locations E4h-E7h. Finally, pushing register EDX 118 on to the stack 122 causes the stack pointer 111 to be decremented to address E0h. OP4 is then stored in locations E0h-E3h. The diagram 100 shows the contents of the stack pointer 111 following completion of the execution of the push all instruction by Subroutine A 101.

Following execution of the push all instruction by Subroutine A 101, Subroutine B 102 may then use the general purpose registers 112, 114, 116, 118 as it executes. Accordingly, the diagram 100 shows contents of the registers 112, 114, 116, 118 associated with execution of Subroutine B 102: register EAX 112 contains OP5, OP6 is in register EBX 114, OP7 is in register ECX 116, and OP8 is in register EDX 118. With the concept in mind of how subroutines execute push all/pop all instructions in a microprocessor to prior/subsequent to control transfer, further detail related to how a present day pipeline microprocessor executes a stack is presented with reference to FIG. 2.

Figure 2:
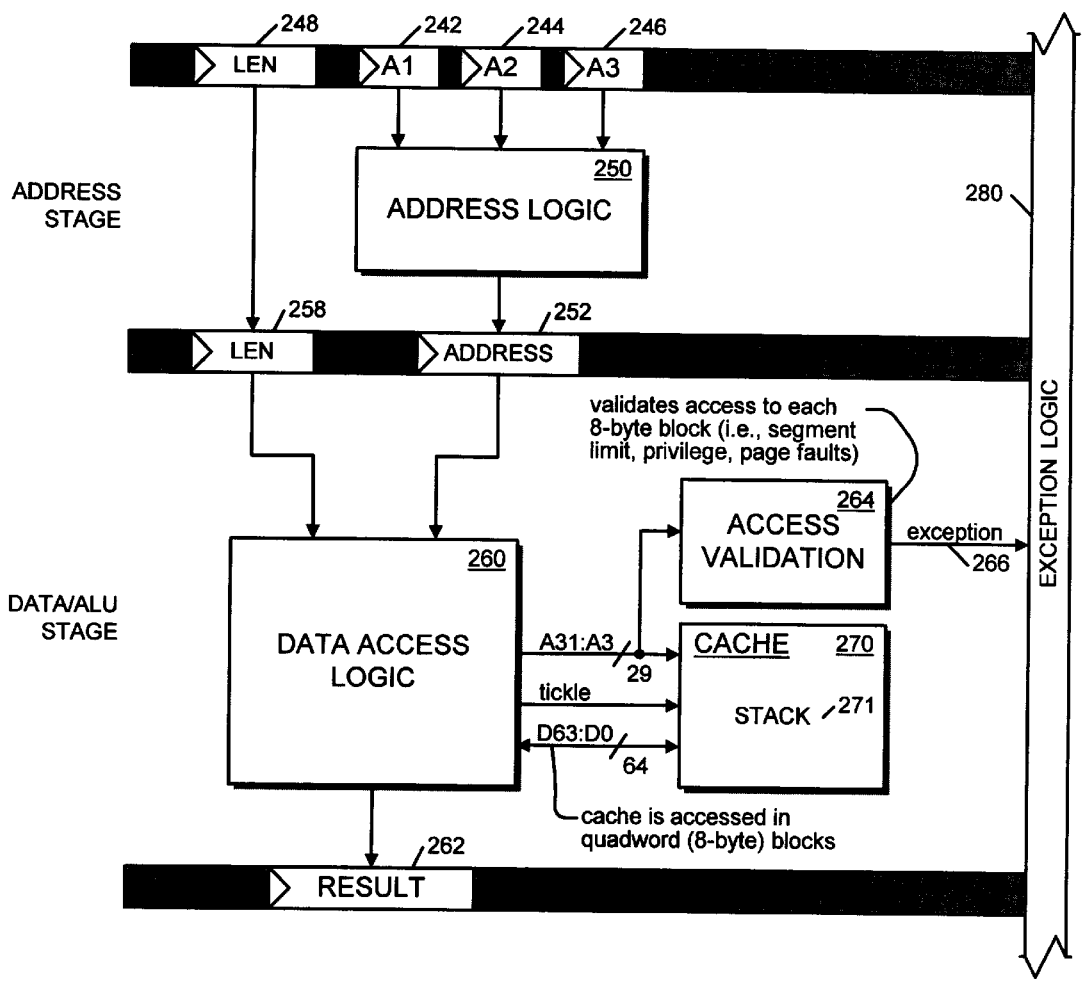
FIG. 2 is a block diagram of a portion of a related art pipeline microprocessor for accessing data entities within a stack.

FIG. 2 is a block diagram of a portion of a related art pipeline microprocessor 200 for accessing operands, or data entities, within a stack. The pipeline microprocessor 200 includes an address stage, for calculating an address of a requested data entity, and a data/ALU stage, for accessing a requested data entity. The address stage has address logic 250 connected to address component registers 242, 244, 246. The address logic 250 provides an output to an address register 252. The data/ALU stage has data access logic 260, connected to access validation logic 264. The data access logic 260 is also connected to a cache 270. A stack 271 is contained within the cache 270. The data access logic 260 provides an output to a result register 262. The access validation logic 264 is connected to exception logic 280.

Operationally, a macro instruction, such as the push all instruction noted above, is provided from memory (not shown) to a fetch stage (not shown) of the microprocessor 200. The macro instruction is then decoded into an associated sequence of micro instructions by a translator (not shown), or instruction decoder, in the microprocessor 200. The sequence of micro instructions directs the microprocessor 200 to perform a series of tasks to accomplish an overall operation specified in the macro instruction. Hence, the push all instruction would be translated into a sequence of eight single push micro instructions, each push micro instruction directing the microprocessor 200 to push one of the eight general purpose registers on to the stack 271. The micro instructions prescribe address components used to calculate a memory address of a data entity. These address components are either directly specified in a micro instruction, or they are indirectly specified by referring to registers within a register file (not shown), which contain the address components. Various addressing methods exist for specifying address components in a micro instruction, to include a mixture of direct and indirect address component specification. A micro instruction additionally prescribes a specific task to be performed by the microprocessor 200, such as storage or retrieval of an operand. Furthermore, for data entity accesses, a micro instruction also prescribes the size of the data entity to be accessed. For example, a push or pop micro instruction would prescribe the address of the associated top of stack in the address component registers 242, 244, 246. The size, also known as the length or width, of the data entity to be accessed in the stack 271, is prescribed in register 248.

Thus, the address logic 250 retrieves the address components from registers 242, 244, 246 and computes the address of the data entity. The address is provided to the address register 252. In addition, the size of the data entity is forwarded to register 258.

A microprocessor 200 employed in a desktop computer system does not routinely access its operands in memory. This is because present day memory technology, i.e., dynamic random access memory (DRAM), used in desktop computer systems is much slower than present day microprocessor technology. In other words, the microprocessor 200 has to wait an inordinate amount of time to store/retrieve an operand to/from DRAM memory. To circumvent the wait associated with DRAM memory, copies of frequently accessed blocks of memory are maintained in a different memory device called a cache 270. In contrast to conventional DRAM memory, a cache 270 is much faster, consumes more power, and is more costly. For these reasons, the size of the cache 270 in present day desktop computer systems is normally much smaller than that of DRAM memory. Hence, hardware and software within the microprocessor 200 work together to insure that copies of frequently accessed memory addresses are maintained within the cache so that they will be present in the cache when required for access by an application program. Accordingly, because application programs frequently perform stack accesses, the diagram of FIG. 2 shows the stack 271 as being maintained in the cache 270.

Data entities are maintained within a cache 270 in groups of bytes called cache lines. A typical cache line is 32 bytes in length. When a request is made for a data entity that is not present within the cache 270, the entire cache line to which the address of the data entity is mapped is retrieved from memory and placed in the cache 270. A cache 270 is maintained according to cache lines rather than individual data entities because 1) less complex hardware is required to validate and transfer blocks of data to/from a memory; and 2) it is highly probable that subsequent data requests in an application program will access data entities which are located at adjacent memory addresses. Reading a text string in an application program is a fitting example: Sequential characters in the text string are typically stored in consecutive locations in memory. If the first character of the text string is initially not present in the cache 270, then the microprocessor 200 will fill the entire cache line from memory that is associated with the first character of the text string. Filling the entire cache line increases the probability that the remaining characters in the text string will be present in the cache for the remaining accesses.

Additionally, cache lines are further divided into parts called cache sub-lines. This is because typical data busses in a present day microprocessor 200 are greater than one byte in width. In an application program, how data is stored in memory generally conforms to an architected register size within the microprocessor 200. Today's microprocessors have registers sized for doublewords (i.e., 4-byte data entities) or quadwords (i.e., 8-byte data entities). Hence, microprocessors are designed to access a cache sub-line to retrieve/store operands. Present day cache sub-lines are commensurately sized to access doublewords or quadwords. Accordingly, data access logic 260 within the microprocessor 200 is designed to access cache sub-lines. Hence, when a particular data entity is requested, the entire cache sub-line containing the requested data entity is retrieved from the associated cache line in the cache 270.

Yet, present day application programs do not simply require that the microprocessor 200 address and access a requested data entity. In addition, a number of architected protection mechanisms are provided to preclude erroneous or inadvertent accesses. In an x86-compatible microprocessor 200, these protection mechanisms include logic to check segment limits, to validate access privileges, and to indicate paging faults. A comprehensive discussion of protection mechanisms is beyond the scope of this patent; it is sufficient to note that each access to a memory address by an x86-compatible microprocessor 200 must be validated with respect to all protection mechanisms invoked by the application program. If an access is validated, then the access is allowed. A particular violation of a protection mechanism during an access causes the microprocessor 200 to perform a task corresponding to the particular violation. One skilled in the art will appreciate that such violations and their related tasks are referred to generally as exceptions and exception handlers. In brief, inadvertent or erroneous memory accesses cause exceptions in a microprocessor 200.

Hence, to access an operand in the stack 271, the data access logic 260 retrieves the computed address of the operand from the address register 252 and the length of the operand from register 258. The address of the cache sub-line containing the address of the operand is provided to access validation logic 264 and the cache. The access validation logic 264 validates the access to the cache sub-line. If the access is not valid, then a signal 266 is provided to exception logic 280. The exception logic 280 would then invoke an exception handler to manage the invalid access.

In the case of a valid access, the entire cache sub-line is provided, in the case of a data retrieval, to the data access logic 260. FIG. 2 shows a data bus configuration designed to access an 8-byte cache sub-line. The data access logic 260 then retrieves the data entity from the cache sub-line and places it in the result register 262. In the case of a valid data storage operation, the data entity to be stored in the stack 271 would be provided in an operand register (not shown) to the data access logic 260. The data access logic 260 would then position the data entity within a buffer (not shown) the size of the cache sub-line, which would then be written to the cache 270.

The above scenario reflects the general case for accessing the cache. In fact, it presupposes that a requested operand is contained entirely within a single cache sub-line. But this is not always the case. And, because the microprocessor 200 accesses entire cache sub-lines to retrieve or store data entities, and since each individual access must be validated against applied protection mechanisms, it is important to understand that the manner in which a given data entity is located, or aligned, within the cache 270 directly impacts the time required to access it. The concept of alignment and related affects is more specifically described with reference to FIG. 3.

Figure 3:
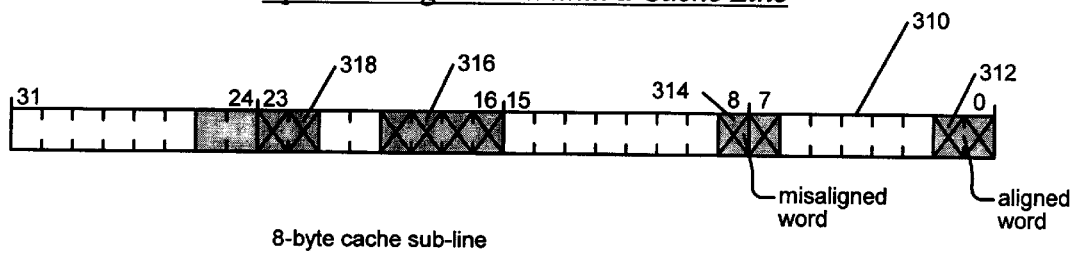
FIG. 3 is a diagram depicting aligned and misaligned data entities within a cache line.

Referring to FIG. 3, a diagram of a portion of a data cache 300 is presented illustrating a 32-byte cache line 310. A data entity may be stored in any location within the cache line 310 or it may be partially stored within the cache line 310 and an adjacent cache line (not shown), provided that the data entity's constituent bytes are stored in adjacent byte locations within the cache 200. Byte 31 of the cache line 310 is considered to be adjacent to byte 0 of a following cache line (not shown).

Although the cache line 310 is 32 bytes wide, as described above, a microprocessor accesses entire cache sub-lines to retrieve or store requested data entities. The following operational discussion applies to a cache 300 with 8-byte cache sub-lines, like that of FIG. 2.

To access a data entity in a cache typically requires one cycle of the microprocessor clock (i.e., one instruction cycle), if the requested data entity resides entirely within a single cache sub-line. When a data entity resides within a single cache sub-line, it is considered to be aligned within the cache. Access validation logic and data access logic in the microprocessor are configured to optimally perform accesses to aligned data entities. Such accesses are known as aligned accesses. If, however, a requested data entity does not reside entirely within a single cache sub-line, i.e., a first part of it resides in a first cache sub-line and a remaining part of it resides in an adjacent cache sub-line, then accessing the data entity is more complicated. When a data entity does not reside entirely within a single cache sub-line, it is considered to be misaligned within the cache. Because it crosses a cache sub-line boundary, then more than one instruction cycle is required to validate and access the data entity. Access of a misaligned data entity is called a misaligned access.

As noted above, an aligned access takes one instruction cycle. It follows then, that two aligned accesses require two instruction cycles. Yet, although access of a misaligned data entity (not exceeding 16 bytes in size, for this example) comprises access to only two cache sub-lines, the misaligned access takes more than two instruction cycles. This is because the two cache sub-line accesses are not independent of each other. For the misaligned access to execute properly, protection mechanisms for both of the two cache sub-lines must be validated for access prior to retrieving or storing the data entity. To provide for otherwise could possibly result in the data entity being only partially retrieved or stored.

A common method for performing a misaligned access employs a technique called a tickle. A tickle performs all of the protection mechanism validation steps associated with a cache sub-line without actually accessing the data in the cache sub-line. Hence, to perform a misaligned access requires that a first cache sub-line be tickled. If the tickle passes, i.e., access to the first sub-line is validated, then a second cache sub-line is fully accessed, followed by full access of the first cache sub-line. Thus, three instruction cycles are required to perform a misaligned access: a first part tickle, a second part full access, and a first part full access. Several cases of data entity access from the data cache 300 will now be discussed to more fully illustrate. Although the following discussion is characterized in terms of data retrieval, one skilled in the art will concur that the discussion points are equally applicable to data storage.

A word 312 having a width of two bytes is shown within line 310. It is stored in byte positions 0 and 1 of line 310. It is aligned because it is completely stored within a single cache sub-line comprising bytes 0 through 7. Because it is aligned, it may be retrieved in one cycle.

A second word 314 is shown within the line 310. It is stored in byte positions 7 and 8. It is misaligned within line 310 because a first byte of the word 314 is stored within a cache sub-line comprising bytes 0 through 7 and a remaining second byte is stored within a following cache sub-line comprising bytes 8 through 15. Because the word is misaligned, it takes three instruction cycles to retrieve it.

A doubleword 316, having a length of four bytes, is stored in bytes 16 through 19 of line 310. It is aligned within a cache sub-line comprising bytes 16 through 23 of line 310. Because it is aligned, it may be loaded in one cycle.

A second doubleword 318 occupies bytes 22 through 25 of line 310. Loading of the doubleword 318 requires three instruction cycles because it crosses a cache sub-line boundary marked by bytes 23 and 24 of line 310.

Referring back to FIG. 2, as described earlier, the data access logic 260 is configured to optimally perform accesses to aligned data entities. If the data access logic 260 finds that an access of the size specified in register 258 to the computed address would result in an aligned access, then the address of the cache sub-line containing the data entity is provided to the access validation logic 264 and the cache 270. The protection mechanism checks are performed by the access validation logic 264 during the same instruction cycle that the cache sub-line is accessed in the cache 270. If the access is valid, then the data entities in the complete cache sub-line are accessed. If the data access logic 260 finds that an access of the size specified in register 258 to the computed address would result in a misaligned access, then a first address of a first cache sub-line containing a first part of the data entity is provided to the access validation logic 264. The first address is provided to the cache 270 along with a tickle signal, directing the cache 270 to not access the first cache sub-line. The protection mechanism checks for the first cache sub-line are performed by the access validation logic 264 during a first instruction cycle. If access to the first cache sub-line is not valid, then the access operation ends by signaling an exception. If access to the first cache sub-line is valid, then a second address of a second cache sub-line containing a second part of the data entity is provided to the access validation logic 264. The second address is provided to the cache 270 without a tickle signal, thus directing the cache 270 to access the second cache sub-line. The protection mechanism checks for the second cache sub-line are performed by the access validation logic 264 during a second instruction cycle wherein contents of the second cache sub-line are accessed. During a third instruction cycle, the first cache sub-line is accessed in the same manner as is described for the second cache sub-line. Consequently, three cycles are required to access a misaligned data entity. One skilled in the art will appreciate that the first cache sub-line can be the cache sub-line containing the low-order part of the data entity or the cache sub-line containing the high-order part. Such mapping is a detail unique to a particular microprocessor design.

Figure 4:
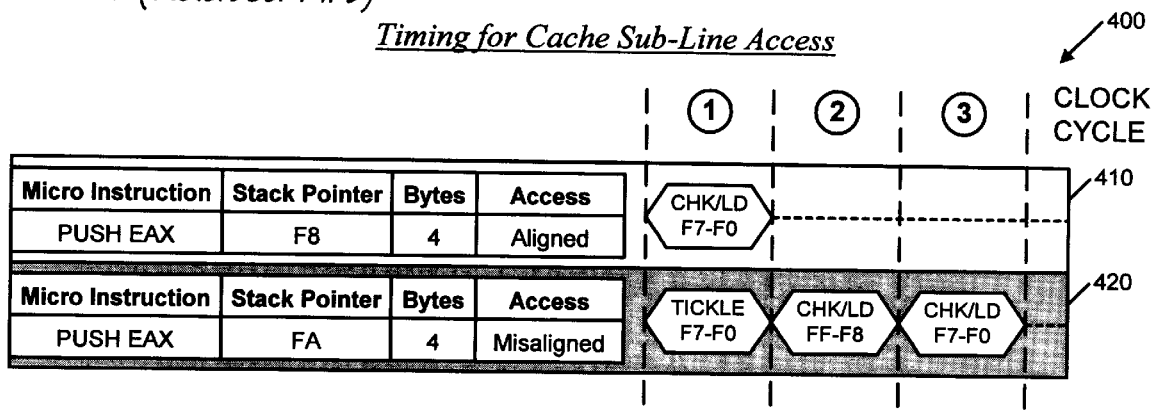
FIG. 4 is a timing diagram illustrating execution of push micro instructions by the microprocessor of FIG. 2 to access aligned and misaligned data entities in a stack.

Now referring to FIG. 4, a timing diagram 400 illustrating execution of push micro instructions by the microprocessor of FIG. 2 to access aligned and misaligned data entities in the stack 271 is presented. Two push scenarios are presented: an aligned 4-byte push 410 and a misaligned 4-byte push 420. Operations of the address stage of the microprocessor 200 are shown with respect to clock cycles, or instruction cycles. The following discussion presumes the stack 271 is located in cache 270 beginning with address 00h and is divided into 8-byte cache sub-lines. For example, an operand wholly contained within addresses 07h-00h is aligned within the cache 270. A data entity which is partially contained in the cache sub-line defined by addresses 07h-00h and is partially contained in the next cache sub-line defined by addresses 08h-0Fh is misaligned.

Referring to scenario 410, a push micro instruction, designated PUSH EAX, is provided to the address stage. The micro instruction directs the microprocessor 200 to perform a single push operation to the stack 271 of the 4-byte contents of register EAX. Because the stack pointer indicates address F8h, the data access logic 260 determines that the access is aligned. As a result, during clock cycle 1, a cache sub-line address, F0h, is provided by the data access logic 260 to both the cache 270 and the access validation logic 264. Thus, the push operation requires only one clock cycle to access the stack.

Referring to scenario 420, a push micro instruction, designated PUSH FAX, is provided to the address stage. The micro instruction directs the microprocessor 200 to perform a single push operation to the stack of the 4-byte contents of register EAX. But in this scenario 420, because the stack pointer indicates address FAh, the data access logic 260 determines that the access is misaligned. This is because the 4-byte operand targeted for the stack from register EAX is to be stored in addresses F9h-F6h, which crosses a cache sub-line boundary. As a result, during clock cycle 1, a first part tickle is performed by providing a first cache sub-line address, F0h, to the cache 270 along with a tickle signal. The first cache sub-line address is also provided to the access validation logic 264 so that access checks can be performed. During clock cycle 2, a second part full access is performed by providing a second cache sub-line address, F8h, to the cache 270 and the access validation logic 264. Finally, during clock cycle 3, a first part full access is performed by providing the first sub-line address, F0h, without the tickle signal, to both the cache 270 and the access validation logic 264. Thus, the misaligned push operation requires three clock cycles to access the stack.

With the above background on aligned/misaligned accesses within a cache and related timing implications, a problem associated with repeatedly accessing operands in a stack will now be discussed with reference to FIG. 5.

Figure 5:
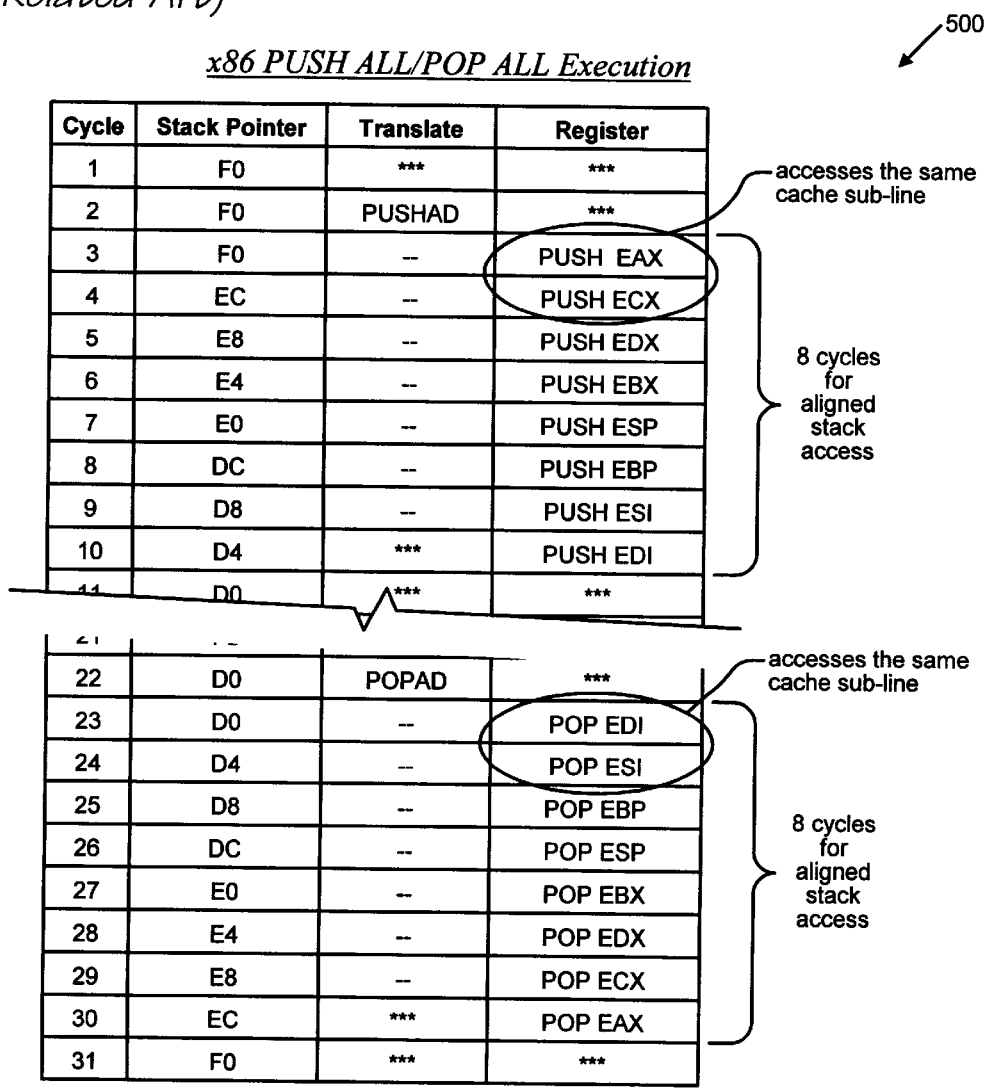
FIG. 5 is a table illustrating execution of a push all instruction and a pop all instruction by the microprocessor of FIG. 2.

FIG. 5 is a table 500 illustrating execution of a push all instruction and a pop all instruction by the microprocessor 200 of FIG. 2. As stated above, push all/pop all instructions are routinely used by subroutines within application programs to temporarily store/retrieve general purpose register contents prior/subsequent to program control transfers. Generally, push all and pop all instructions are referred to as access all instructions, or access all stack instructions. Progression of the instructions through the translate and register stages of the microprocessor 200 is shown with respect to cycles of a pipeline clock. Instructions before and after instructions of interest are designated by "*." Voids, or slips in the pipeline are designated by "--." For clarity, FIG. 5** depicts those stages of the microprocessor pipeline that are relevant to how push all/pop all macro instructions are decoded and provided to the register stage.

During cycle 2, a push all macro instruction proceeds through the translate stage. The push all macro instruction is designated PUSHAD. It directs the microprocessor 200 to push the contents of general purpose registers EAX, ECX, EDX, EBX, ESP, EBP, ESI, and EDI on the stack 271. In an x86-compatible microprocessor 200, there are two forms of the push all macro instruction: one form characterizes the size of the general purpose registers as 16-bit (i.e., 2-byte) registers; a second form, the form shown in the diagram 500, characterizes the size of the general purpose registers as 32-bit (i.e., 4-byte) registers. An x86compatible microprocessor contains means to select the size of these registers, i.e., 16-bit or 32-bit mode. Further discussion of this aspect of an x86-compatible microprocessor is beyond the scope of this patent. Hence each of the general purpose registers contain a 4-byte data entity to be placed on the stack 271. Initially, the stack pointer in the microprocessor 200 indicates that the top of stack is at address F0h.

During cycle 3, a first push micro instruction proceeds through the register stage of the microprocessor 200. The first push micro instruction is designated PUSH EAX. It directs the microprocessor 200 to push the contents of register EAX on the stack 271. The stack pointer still indicates the top of stack is at address F0h. Because register EAX is a 4-byte register, execution of the instruction will cause the stack pointer to be decremented to indicate a new top of stack at address ECh and the contents of the register will be stored in locations EFh-ECh. Also during cycle 3, a slip is inserted into the pipeline to prevent following instructions from prematurely advancing.

During cycle 4, a second push micro instruction proceeds through the register stage of the microprocessor 200. The second push micro instruction is designated PUSH ECX. It directs the microprocessor 200 to push the contents of register EBX on the stack 271. The stack pointer now indicates the new top of stack is at address ECh. Because register ECX is a 4-byte register, execution of the instruction will cause the stack pointer to be decremented to indicate a new top of stack at address E8h and the contents of the register will be stored in locations EBh-E8h. Also during cycle 4, a slip is inserted into the pipeline to prevent following instructions from prematurely advancing. But, recalling that the cache 270 of FIG. 2 is aligned along 8-byte boundaries, it is significant to note that, although the accesses for registers EAX and EBX are individually aligned accesses, both of the accesses are to the same sub-line in the cache 270.

During cycle 5, a third push micro instruction proceeds through the register stage of the microprocessor 200. The third push micro instruction is designated PUSH EDX. It directs the microprocessor 200 to push the contents of register EDX on the stack 271. The stack pointer indicates the top of stack is at address E8h. Because register EDX is a 4-byte register, execution of the instruction will cause the stack pointer to be decremented to indicate a new top of stack at address E4h and the contents of the register will be stored in locations E7h-E4h. Also during cycle 5, a slip is inserted into the pipeline to prevent following instructions from prematurely advancing.

During cycle 6, a fourth push micro instruction proceeds through the register stage of the microprocessor 200. The fourth push micro instruction is designated PUSH EBX. It directs the microprocessor 200 to push the contents of register EBX on the stack 271. The stack pointer indicates the top of stack is at address E4h. Because register EBX is a 4-byte register, execution of the instruction will cause the stack pointer to be decremented to indicate a new top of stack at address E0h and the contents of the register will be stored in locations E3h-E0h. Also during cycle 6, a slip is inserted into the pipeline to prevent following instructions from prematurely advancing. Like the pair of push micro instructions discussed with reference to cycles 3 and 4, the push micro instructions in cycles 5 and 6 access the same sub-line in the cache 270.

During cycle 7, a fifth push micro instruction proceeds through the register stage of the microprocessor 200. The fifth push micro instruction is designated PUSH ESP. It directs the microprocessor 200 to push the contents of register ESP on the stack 271. The stack pointer indicates the top of stack is at address E0h. Because register ESP is a 4-byte register, execution of the instruction will cause the stack pointer to be decremented to indicate a top of stack at address DCh and the contents of the register will be stored in locations DFh-DCh. Also during cycle 7, a slip is inserted into the pipeline to prevent following instructions from prematurely advancing.

During cycle 8, a sixth push micro instruction proceeds through the register stage of the microprocessor 200. It is designated PUSH EBP. It directs the microprocessor 200 to push the contents of register EBP on the stack 271. The stack pointer indicates the top of stack is at address DCh. Because register EBP is a 4-byte register, execution of the instruction will cause the stack pointer to be decremented to indicate a new top of stack at address D8h and the contents of the register will be stored in locations DBh-D8h. Also during cycle 8, a slip is inserted into the pipeline to prevent following instructions from prematurely advancing. Like the previous pairs of push micro instructions, the push micro instructions in cycles 7 and 8 access the same sub-line in the cache 270.

During cycle 9, a seventh push micro instruction proceeds through the register stage of the microprocessor 200. It is designated PUSH ESI. It directs the microprocessor 200 to push the contents of register ESI on the stack 271. The stack pointer indicates the top of stack is at address D8h. Because register ESI is a 4-byte register, execution of the instruction will cause the stack pointer to be decremented to indicate a top of stack at address D4h and the contents of the register will be stored in locations D7h-D4h. Also during cycle 9, a slip is inserted into the pipeline to prevent following instructions from prematurely advancing.

During cycle 10, an eighth push micro instruction proceeds through the register stage of the microprocessor 200. It is designated PUSH EDI. It directs the microprocessor 200 to push the contents of register EDI on the stack 271. The stack pointer indicates the top of stack is at address D4h. Because register EDI is a 4-byte register, execution of the instruction will cause the stack pointer to be decremented to indicate a new top of stack at address D0h and the contents of the register will be stored in locations D3h-D0h. Also during cycle 10, because this is the last micro instruction to be issued by the translator to accomplish the push all operation, a next macro instruction proceeds through the translate stage of the microprocessor 200. And, like the previous pairs of push micro instructions, the push micro instructions in cycles 9 and 10 access the same sub-line in the cache 270.

Because the eight accesses prescribed by the eight push micro instructions are individually aligned within the cache 270, the data access logic 260 only requires one cycle to place each operand on the stack 271. Hence, it requires eight cycles of the microprocessor clock to perform the push all operation. Yet, only four distinct cache sub-lines are accessed during the operation. And, each of the four cache sub-lines is accessed twice in succession to store adjacently located operands.

During cycle 22, a pop all macro instruction proceeds through the translate stage. The pop all macro instruction is designated POPAD. It directs the microprocessor 200 to pop the contents of general purpose registers EDI, ESI, EBP, ESP, EBX, EDX, ECX, and EAX from the stack 271. Like the push all instruction, means within an x86-compatible microprocessor is used to select the size of the registers, i.e., 16-bit or 32-bit mode, and hence the mode of the pop all instruction. Initially, the stack pointer indicates that the top of stack is at address D0h.

During cycle 23, a pop micro instruction proceeds through the register stage. It is designated POP EDI. It directs the microprocessor 200 to pop a 4-byte operand from the stack 271 and place it in register EDI. The stack pointer still indicates the top of stack is at address D0h. Hence, execution of the instruction will cause the stack pointer to be incremented to indicate address D4h following retrieval of the operand stored in locations D3h-D0h. Also during cycle 23, a slip is inserted into the pipeline to prevent following instructions from prematurely advancing.

During cycle 24, a pop micro instruction proceeds through the register stage. It is designated POP ESI. It directs the microprocessor 200 to pop a 4-byte operand from the stack 271 and place it in register ESI. The stack pointer indicates the top of stack is at address D4h. Hence, execution of the instruction will cause the stack pointer to be incremented to indicate address D8h following retrieval of the operand stored in locations D7h-D4h. Also during cycle 24, a slip is inserted into the pipeline to prevent following instructions from prematurely advancing. As discussed above, it is significant to note that, although the accesses for registers EDI and ESI are individually aligned accesses, both of the accesses are to the same sub-line in the cache 270.

During cycle 25, a pop micro instruction proceeds through the register stage. It is designated POP EBP. It directs the microprocessor 200 to pop a 4-byte operand from the stack 271 and place it in register EBP. The stack pointer indicates address D8h. Hence, execution of the instruction will cause the stack pointer to be incremented to indicate address DCh following retrieval of the operand stored in locations DBh-D8h. Also during cycle 25, a slip is inserted into the pipeline to prevent following instructions from prematurely advancing.

During cycle 26, a pop micro instruction proceeds through the register stage. It is designated POP ESP. It directs the microprocessor 200 to pop a 4-byte operand from the stack 271 and place it in register ESP. The stack pointer indicates address DCh. Hence, execution of the instruction will cause the stack pointer to be incremented to indicate address E0h following retrieval of the operand stored in locations DFh-DCh. Also during cycle 26, a slip is inserted into the pipeline to prevent following instructions from prematurely advancing. As discussed above, it is significant to note that, although the accesses for registers EBP and ESP are individually aligned accesses, both of the accesses are to the same sub-line in the cache 270.

During cycle 27, a pop micro instruction proceeds through the register stage. It is designated POP EBX. It directs the microprocessor 200 to pop a 4-byte operand from the stack 271 and place it in register EBX. The stack pointer indicates address E0h. Hence, execution of the instruction will cause the stack pointer to be incremented to indicate address E4h following retrieval of the operand stored in locations E3h-E0h. Also during cycle 27, a slip is inserted into the pipeline to prevent following instructions from prematurely advancing.

During cycle 28, a pop micro instruction proceeds through the register stage. It is designated POP EDX. It directs the microprocessor 200 to pop a 4-byte operand from the stack 271 and place it in register EDX. The stack pointer indicates address E4h. Hence, execution of the instruction will cause the stack pointer to be incremented to indicate address E8h following retrieval of the operand stored in locations E7h-E4h. Also during cycle 28, a slip is inserted into the pipeline to prevent following instructions from prematurely advancing. Like before, although the accesses for registers EBX and EDX are individually aligned accesses, both of the accesses are to the same sub-line in the cache 270.

During cycle 29, a pop micro instruction proceeds through the register stage. It is designated POP ECX. It directs the microprocessor 200 to pop a 4-byte operand from the stack 271 and place it in register ECX. The stack pointer indicates address E8h. Hence, execution of the instruction will cause the stack pointer to be incremented to indicate address ECh following retrieval of the operand stored in locations EBh-E8h. Also during cycle 29, a slip is inserted into the pipeline to prevent following instructions from prematurely advancing.

During cycle 30, a pop micro instruction proceeds through the register stage. It is designated POP EAX. It directs the microprocessor 200 to pop a 4-byte operand from the stack 271 and place it in register EAX. The stack pointer indicates address ECh. Hence, execution of the instruction will cause the stack pointer to be incremented to indicate address F0h following retrieval of the operand stored in locations EFh-ECh. Also during cycle 30, because this is the last micro instruction to be issued by the translator to accomplish the pop all operation, a next macro instruction proceeds through the translate stage of the microprocessor 200. And, like the previous pairs of pop micro instructions, the pop micro instructions in cycles 29 and 30 access the same sub-line in the cache 270.

Because the eight accesses prescribed by the eight pop micro instructions are individually aligned within the cache 270, the data access logic 260 only requires one cycle to retrieve each operand from the stack 271. Hence, it requires eight cycles of the microprocessor clock to perform the pop all operation. Yet, only four distinct cache sub-lines are accessed during the operation. And, each of the four cache sub-lines is accessed twice in succession to retrieve adjacently located operands.

In summary, because the operands are individually aligned, execution of the push all instruction requires only eight cycles of the microprocessor clock. Similarly, execution of the pop all instruction only requires eight cycles. And, virtually all of the automated tools used by software engineers to generate application programs insure that data entities are individually aligned in memory according to the cache architecture of their target microprocessor. Because of this, misaligned accesses caused due to individually misaligned data entities are essentially nonexistent.

Nevertheless, increased processing demands in desktop applications continue to challenge microprocessor designers to improve the execution efficiency of fundamental and frequently used instructions. And, since access all stack instructions, i.e., push all instructions and pop all instructions, are frequently used by subroutines in an application program to affect orderly control transfer, it is advantageous to improve the efficiency and speed with which they execute.

Recalling that each access to a memory address is performed at the cache sub-line level by data access logic 260 in the microprocessor 200, it follows then that back-to-back stack accesses result in a significant amount of wasted instruction cycles. The example of FIG. 5 shows that two cache sub-line accesses are being made in sequence to the same cache sub-line, but only to access one operand at a time, at the expense of having to access the same cache sub-line again to access a following operand. This is a problem indicating that the resources of a microprocessor are not being fully utilized. One skilled in the art will concur that improvements to the execution efficiency of macro instructions that direct a microprocessor to access multiple operands in a stack will result in significant improvements to the performance of virtually any application program. The problem associated with repeated stack accesses in present day microprocessors, particularly with regard to execution of push all and pop all instructions, is addressed by the present invention.

The present invention exploits the fact that execution of an access all stack instruction-by its very nature-causes a microprocessor to access multiple adjacently located operands in the stack. The present invention, therefore, combines accesses to aligned groups of adjacently located operands into a combined access whereby all of the operands in an aligned group are accessed at the same time. Hence, redundant and unnecessary accesses to the same cache line are eliminated and performance of an application program is improved.

A microprocessor according to the present invention maintains an image of a stack pointer within its translate stage. When an access all stack macro instruction is encountered, logic within the translate stage predicts the alignment groups of operands within the set of operands prescribed by the access all stack macro instruction. In the case where a combined access would yield positive performance results, a double push/pop micro instruction, PUSH/POP2, is generated by the translator. The PUSH2/POP micro instructions are then ordered with single push/pop micro instructions, PUSH/POP, to produce a sequence of micro instructions to store/retrieve all of the operands prescribed by the access all macro instruction. The present invention is more specifically described with reference to FIG. 6.

Figure 6:
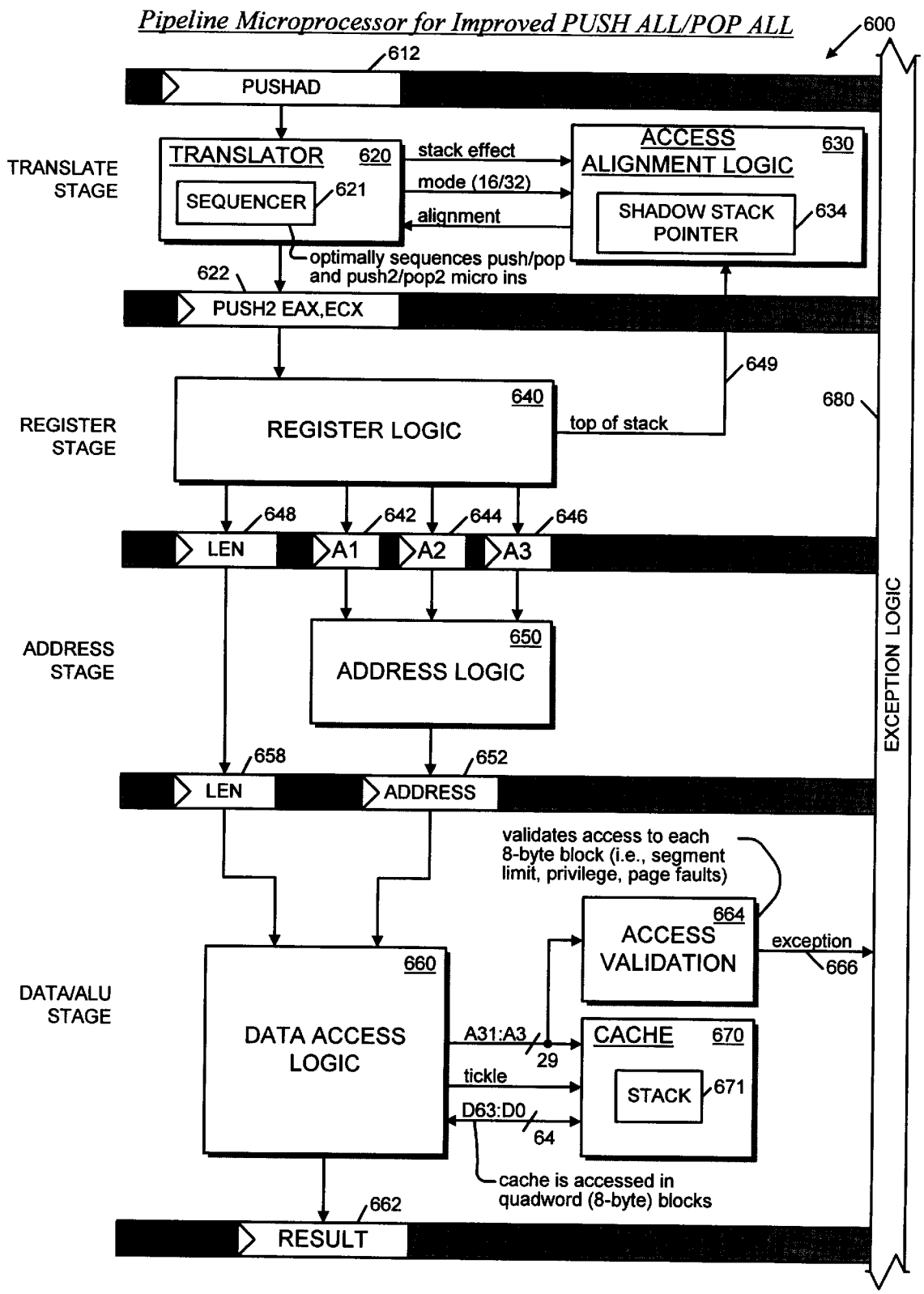
FIG. 6 is a block diagram of a pipeline microprocessor according to the present invention for performing push all and pop all operations.

Referring to FIG. 6, a block diagram of a pipeline microprocessor 600 according to the present invention is presented. The microprocessor 600 has six pipeline stages: fetch (not shown), translate, register, address, data/ALU, and write back (not shown). The fetch stage fetches macro instructions from memory (not shown) that are to be executed by the microprocessor 600 and places them in a macro instruction buffer 612. The translate stage includes a translator 620, which is connected to access alignment logic 630. The output of the translator is provided to a micro instruction register 622. The register stage has register logic 640 which provides outputs to three address component registers 642, 644, 646 and a length register 648. The address stage has address logic 650 providing an output to an address register 652. The data/ALU stage includes data access logic 660, which is connected to both a cache 670 and access validation logic 664. Inside the cache 670 is a stack 671. The data access logic 660 provides an output to a result register 662. The access validation logic provides a signal to exception logic 680 via bus 666. The write back stage updates registers in the register logic 640 using results contained in the result register 662. Micro instructions move through successive stages of the microprocessor pipeline in synchronization with a microprocessor clock.

Operationally, fetched macro instructions are provided to the macro instruction buffer 612. A push all macro instruction, PUSHAD, is shown in the macro instruction buffer 612.

The translator 620 retrieves a macro instruction from the macro instruction buffer 612 and decodes it into a sequence of associated micro instructions. The micro instructions are sequentially provided to the micro instruction buffer 622. The access alignment logic 630 has a shadow stack pointer 634. The shadow stack pointer 634 is synchronized with the microprocessor's stack pointer (not shown), which is contained within the register logic 640. The stack pointer contents are provided to the access alignment logic 630 via bus 649. When an access all stack macro instruction is encountered within the translate stage, the shadow stack pointer 634 is adjusted to reflect a new top of stack resulting from proper execution of the access all stack macro instruction. The translator 620 provides signals to the access alignment logic 630 indicating effect of the access all stack macro instruction to the top of stack and the microprocessor's mode of operation (i.e., 16-bit, 32-bit, etc.). As a result, the shadow stack pointer 634 determines the new top of stack. A signal is thus provided to the translator 620 indicating stack alignment of operands associated with the access all stack macro instruction. If it is determined that access to a pair of operands can be combined into a single, combined access to a cache sub-line, then the translator 620 generates a double push/pop micro instruction, PUSH2/POP2. If the access alignment logic 630 estimates that performance degradation would result from pairing operands into a single access, then the translator 620 generates single push/pop macro instructions. A sequencer 621 within the translator 620 orders the generated single and double push/pop micro instructions into a sequence of micro instructions to access all of the operands in the stack 671 prescribed by the access all stack macro instruction. Micro instructions are then sequentially provided to the micro instruction buffer 622. A double push micro instruction is shown in the micro instruction buffer 622.

Micro instructions are retrieved from the micro instruction buffer 622 by the register logic 640. The register logic 640 retrieves operands prescribed by a micro instruction from a register file (not shown). Stack access micro instructions, i.e., push/pop micro instructions, cause the register logic to provide address components in registers 642, 644, and 646 prescribing the address of the top of the stack 671. The length of an operand to be pushed/popped is provided in register 648. For example, for a single 16-bit push micro instruction, the register logic 640 provides address components for the top of stack to the address component registers 642, 644, 646 along with an operand length of two bytes in register 648. For the double 32-bit push micro instruction shown in the micro instruction buffer 622, PUSH2 EAX,ECX, the register logic 640 provides address components for a combined data entity comprising a first and a second operand to the address component registers 642, 644, 646 along with a length of eight bytes in register 648.

The address logic 650 retrieves the address components and computes a memory address for the operand or combined operand as described above with reference to FIG. 2. The computed address is provided in register 652. In addition, the operand length is forwarded to register 658.

Data access logic 660 retrieves the computed address from the address register 652 and the length from register 658. If the data access logic 660 finds that an access of the size specified in register 658 to the computed address would result in an aligned access, then the address of the cache sub-line containing the data entity is provided to the access validation logic 664 and the cache 670. The protection mechanism checks are performed by the access validation logic 664 concurrent with access to sub-line in the cache 670. If the access is valid, then the entire cache sub-line is accessed. Results of data retrievals from the cache sub-line are placed in the result register 662. A store operation writes a provided operand to the cache sub-line. The operand is provided to the data access logic 660 in an operand register (not shown) by previous stages in the microprocessor pipeline. Invalid cache sub-line accesses cause the access validation logic 664 to signal an exception to the exception logic 680 via bus 666. Misaligned accesses, requiring three cycles are performed in the same manner as described with reference to FIG. 2 and FIG. 4.

Thus, when a PUSH2/POP2 micro instruction is executed by a microprocessor according to the present invention, the data access logic 660 accesses two operands in the stack 671 during a single access to the cache 670. As a result, repeated accesses to the same cache line are eliminated.

Under conditions where alignment of the operands associated with a push all/pop all instruction results in the generation of only four double push/pop micro instructions, the time to execute the push all/pop all operation is cut in half: four instruction cycles versus eight instruction cycles. Under less than optimum alignment conditions, the resulting sequence of single push/pop and double push/pop micro instructions still results in a notable performance improvement over that presently extant in the art.

Now referring to FIG. 7, a table 700 is presented illustrating execution of push all/pop all instructions by the microprocessor of FIG. 6 for aligned and misaligned access cases. Progression of the instructions through the translate and register stages of the microprocessor 600 is shown with respect to cycles of a pipeline clock. Instructions before and after instructions of interest are designated by "***." Voids, or slips in the pipeline are designated by "---." For clarity, FIG. 7 only depicts those stages of the microprocessor pipeline that are relevant to how push all/pop all macro instructions are decoded and provided to the register stage.

During cycle 2, a push all macro instruction proceeds through the translate stage. The push all macro instruction is designated PUSHAD. It directs the microprocessor 600 to push the contents of general purpose registers EAX, ECX, EDX, EBX, ESP, EBP, ESI, and EDI on the stack 671. Each of the general purpose registers contain a 4-byte data entity to be placed on the stack 671. Initially, the stack pointer in the microprocessor 600 indicates that the top of stack is at address F0h. The discussion herein assumes that alignment within the stack 671 is determined along 8-byte alignment boundaries. It is during this cycle that the stack affect and mode (i.e., 16-bit or 32-bit) of the instruction are provided to the access alignment logic 630. Because the shadow stack pointer 634 is at address F0h, it is determined that the eight accesses to the stack 671 to store the eight register operands can be accomplished in four double accesses. This alignment determination is provided to the translator 620. As a result, the sequencer 621 orders four double push micro instructions to accomplish the eight pushes to the stack 671.

During cycle 3, a first double push micro instruction proceeds through the register stage of the microprocessor 600. The first double push micro instruction is designated PUSH2 EAX, ECX. It directs the microprocessor 600 to push the combined contents of register EAX and register ECX to the stack 671 in a combined access. The stack pointer indicates the top of stack is at address F0h. Because the combined contents of registers EAX and ECX is an 8-byte data entity, execution of the instruction will cause the stack pointer to be decremented to indicate a new top of stack at address E8h and the contents of the two registers will be stored in locations EFh-E8h. Also during cycle 3, a slip is inserted into the pipeline to prevent following instructions from prematurely advancing.

During cycle 4, a second double push micro instruction proceeds through the register stage of the microprocessor 600. The second double push micro instruction is designated PUSH2 EDX,EBX. It directs the microprocessor 600 to push the combined contents of registers EDX and EBX to the stack 671 in a combined access. The stack pointer now indicates the top of stack is at address E8h. Because the combined contents of registers EDX and EBX is an 8-byte data entity, execution of the instruction will cause the stack pointer to be decremented to indicate a new top of stack at address E0h and the contents of the registers will be stored in locations E7h-E0h. Also during cycle 4, a slip is inserted into the pipeline to prevent following instructions from prematurely advancing.

During cycle 5, a third double push micro instruction proceeds through the register stage of the microprocessor 600. The third double push micro instruction is designated PUSH2 ESP,EBP. It directs the microprocessor 600 to push the combined contents of register ESP and register EBP to the stack 671 in a combined access. The stack pointer indicates the top of stack is at address E0h. Because the combined contents of registers ESP and EBP is an 8-byte data entity, execution of the instruction will cause the stack pointer to be decremented to indicate a new top of stack at address D8h and the contents of the two registers will be stored in locations DFh-D8h. Also during cycle 5, a slip is inserted into the pipeline to prevent following instructions from prematurely advancing.

During cycle 6, a fourth double push micro instruction proceeds through the register stage of the microprocessor 600. The fourth double push micro instruction is designated PUSH2 ESI,EDI. It directs the microprocessor 600 to push the combined contents of registers ESI and EDI to the stack 671 in a combined access. The stack pointer now indicates the top of stack is at address D8h. Because the combined contents of registers ESI and EDI is an 8-byte data entity, execution of the instruction will cause the stack pointer to be decremented to indicate a new top of stack at address D0h and the contents of the registers will be stored in locations D7h-D0h. Also during cycle 6, because the fourth double push micro instruction is the last micro instruction in the micro instruction sequence, a following macro instruction is allowed to proceed through the translate stage.

To accomplish a push all macro instruction according to the present invention, under conditions where all of the operands can be paired together for combined accesses, the eight prescribed accesses require only four cycles of the microprocessor clock. The four distinct cache sub-lines in which the eight operands are placed are each accessed only once during the push all operation.

During cycle 12, a push all macro instruction proceeds through the translate stage. The push all macro instruction is designated PUSHAD. Like before, it directs the microprocessor 600 to push the contents of general purpose registers EAX, ECX, EDX, EBX, ESP, EBP, ESI, and EDI on the stack 671. Each of the general purpose registers contain a 4-byte data entity to be placed on the stack 671. Yet, for execution of this instruction, the stack pointer in the microprocessor 600 indicates that the top of stack is initially at address F4h. Hence, during this cycle the stack affect and mode of the instruction are provided to the access alignment logic 630. But, because the shadow stack pointer 634 is at address F4h, it is determined that the eight accesses to the stack 671 to store the eight register operands can not be accomplished in four double accesses. This is because contents of register EAX are to be placed in the cache sub-line at address F7h-F0h and the contents of register EDI are to be placed in the cache sub-line at address D7h-D0h. Although these two cache lines must be accessed individually, the remaining six accesses to the stack 671 can be paired. Hence, this alignment determination is provided to the translator 620. As a result, the sequencer 621 orders a first single push micro instruction, followed by three double push micro instructions, followed by a second single push micro instruction, to accomplish the eight pushes to the stack 671.

During cycle 13, the first single push micro instruction proceeds through the register stage of the microprocessor 600. It is designated PUSH EAX. It directs the microprocessor 600 to push the contents of register EAX to the stack 671 in a single access. The stack pointer indicates the top of stack is at address F4h. Because the contents of register EAX is a 4-byte data entity, execution of the instruction will cause the stack pointer to be decremented to indicate a new top of stack at address F0h and the contents of the register will be stored in locations F3h-F0h. Also during cycle 13, a slip is inserted into the pipeline to prevent following instructions from prematurely advancing.

During cycle 14, a double push micro instruction proceeds through the register stage of the microprocessor 600. It is designated PUSH2 ECX,EDX. It directs the microprocessor 600 to push the combined contents of registers ECX and EDX to the stack 671 in a combined access. The stack pointer now indicates the top of stack is at address F0h. Because the combined contents of registers ECX and EDX is an 8-byte data entity, execution of the instruction will cause the stack pointer to be decremented to indicate a new top of stack at address E8h and the contents of the registers will be stored in locations EFh-E8h. Also during cycle 14, a slip is inserted into the pipeline to prevent following instructions from prematurely advancing.

During cycle 15, a double push micro instruction proceeds through the register stage of the microprocessor 600. It is designated PUSH2 EBX,ESP. It directs the microprocessor 600 to push the combined contents of register EBX and register ESP to the stack 671 in a combined access. The stack pointer indicates the top of stack is at address E8h. Because the combined contents of registers EBX and ESP is an 8-byte data entity, execution of the instruction will cause the stack pointer to be decremented to indicate a new top of stack at address E0h and the contents of the two registers will be stored in locations E7h-E0h. Also during cycle 15, a slip is inserted into the pipeline to prevent following instructions from prematurely advancing.

During cycle 16, a double push micro instruction proceeds through the register stage of the microprocessor 600. It is designated PUSH2 EBP,ESI. It directs the microprocessor 600 to push the combined contents of registers EBP and ESI to the stack 671 in a combined access. The stack pointer now indicates the top of stack is at address E0h. Because the combined contents of registers EBP and ESI is an 8-byte data entity, execution of the instruction will cause the stack pointer to be decremented to indicate a new top of stack at address D8h and the contents of the registers will be stored in locations DFh-D8h. Also during cycle 16, a slip is inserted into the pipeline to prevent following instructions from prematurely advancing.

During cycle 17, the second single push micro instruction proceeds through the register stage of the microprocessor 600. It is designated PUSH EDI. It directs the microprocessor 600 to push the contents of register EDI to the stack 671 in a single access. The stack pointer indicates the top of stack is at address D8h. Because the contents of register EDI is a 4-byte data entity, execution of the instruction will cause the stack pointer to be decremented to indicate a new top of stack at address D4h and the contents of the register will be stored in locations D7h-D4h. Also during cycle 17, because the second single push micro instruction is the last micro instruction in the micro instruction sequence, a following macro instruction is allowed to proceed through the translate stage.

To accomplish a push all macro instruction according to the present invention, under conditions where six of the eight operands can be paired together for combined accesses, the eight prescribed accesses require only five cycles of the microprocessor clock. In addition, the five distinct cache sub-lines in which the eight operands are placed are each accessed only once during the push all operation.

The previous two cases, where the stack 671 is quadword aligned (i.e., initial top of stack a multiple of eight) and where it is doubleword aligned (i.e., initial top of stack a multiple of four), represent the most commonly encountered cases for a push all instruction in an x86-compatible microprocessor. This is because, as alluded to earlier, present day software engineering tools are optimized to align a stack 671 so that it can be optimally accessed. Although these two cases are most probable, sub-optimum cases may exist. In such sub-optimum cases, one embodiment of the present invention defaults to the ordering discussed with respect to cycles 12 through 17. By doing so, execution of a push all instruction is still improved over that of a present day microprocessor.

Now referring to cycle 22, a pop all macro instruction proceeds through the translate stage. The pop all macro instruction is designated POPAD. It directs the microprocessor 600 to pop eight 32-bit operands off the stack 671 and place them in general purpose registers EDI, ESI, EBP, ESP, EBX, EDX, ECX, and EAX. Each stack operand is a 4-byte data entity to be placed in a designated register. Initially, the stack pointer in the microprocessor 600 indicates that the top of stack is at address D0h. During this cycle the stack affect and mode of the instruction are provided to the access alignment logic 630. Because the shadow stack pointer 634 is at address D0h, it is determined that the eight accesses to the stack 671 to retrieve the eight register operands can be accomplished in four double accesses. This alignment determination is provided to the translator 620. As a result, the sequencer 621 orders four double pop micro instructions to accomplish the eight pops from the stack 671.

During cycle 23, a double pop micro instruction proceeds through the register stage of the microprocessor 600. It is designated POP2 EDI,ESI. It directs the microprocessor 600 to pop an 8-byte combined data entity from the stack 671 and place the first four bytes of it in register EDI and the second four bytes of it in register ESI. The stack pointer indicates the top of stack is at address D0h. Because the combined access pops an 8-byte data entity off the stack 671, execution of the instruction will cause the stack pointer to be incremented to indicate a new top of stack at address D8h and the 8-byte combined operand will be retrieved from locations D7h-D0h. Also during cycle 23, a slip is inserted into the pipeline to prevent following instructions from prematurely advancing.

During cycle 24, a double pop micro instruction proceeds through the register stage of the microprocessor 600. It is designated POP2 EBP,ESP. It directs the microprocessor 600 to pop an 8-byte combined data entity from the stack 671 and place the first four bytes of it in register EBP and the second four bytes of it in register ESP. The stack pointer indicates the top of stack is at address D8h. Because the combined access pops an 8-byte data entity off the stack 671, execution of the instruction will cause the stack pointer to be incremented to indicate a new top of stack at address E0h and the 8-byte combined operand will be retrieved from locations DFh-D8h. Also during cycle 24, a slip is inserted into the pipeline to prevent following instructions from prematurely advancing.

During cycle 25, a double pop micro instruction proceeds through the register stage of the microprocessor 600. It is designated POP2 EBX,EDX. It directs the microprocessor 600 to pop an 8-byte combined data entity from the stack 671 and place the first four bytes of it in register EBX and the second four bytes of it in register EDX. The stack pointer indicates the top of stack is at address E0h. Because the combined access pops an 8-byte data entity off the stack 671, execution of the instruction will cause the stack pointer to be incremented to indicate a new top of stack at address E8h and the 8-byte combined operand will be retrieved from locations E7h-E0h. Also during cycle 25, a slip is inserted into the pipeline to prevent following instructions from prematurely advancing.

During cycle 26, a double pop micro instruction proceeds through the register stage of the microprocessor 600. It is designated POP2 ECX,EAX. It directs the microprocessor 600 to pop an 8-byte combined data entity from the stack 671 and place the first four bytes of it in register ECX and the second four bytes of it in register EAX. The stack pointer indicates the top of stack is at address E8h. Because the combined access pops an 8-byte data entity off the stack 671, execution of the instruction will cause the stack pointer to be incremented to indicate a new top of stack at address F0h and the 8-byte combined operand will be retrieved from locations EFh-E8h. Also during cycle 26, because the double push micro instruction is the last micro instruction in the micro instruction sequence, a following macro instruction is allowed to proceed through the translate stage.

To accomplish a pop all macro instruction according to the present invention, under conditions where all of the operands can be paired together for combined accesses, the eight prescribed accesses require only four cycles of the microprocessor clock. The four distinct cache sub-lines from which the eight operands are retrieved are each accessed only once during the pop all operation.

During cycle 32, a pop all macro instruction proceeds through the translate stage. The pop all macro instruction is designated POPAD. Like before, it directs the microprocessor 600 to pop eight 32-bit operands off the stack 671 and place them in general purpose registers EDI, ESI, EBP, ESP, EBX, EDX, ECX, and EAX. Each of the general purpose registers is a 4-byte register. Yet, for execution of this instruction, the stack pointer in the microprocessor 600 indicates that the top of stack is initially at address D4h. Hence, during this cycle the stack affect and mode of the instruction are provided to the access alignment logic 630. But, because the shadow stack pointer 634 is at address D4h, it is determined that the eight accesses to the stack 671 to retrieve the eight register operands can not be accomplished in four double accesses. This is because an operand to be placed in register EDI is in the cache sub-line at address D7h-D0h and an operand to be placed in register EAX is in the cache sub-line at address F7h-F0h. Although these two cache lines must be accessed individually, the remaining six accesses to the stack 671 can be paired. Hence, this alignment determination is provided to the translator 620. As a result, the sequencer 621 orders a first single pop micro instruction, followed by three double pop micro instructions, followed by a second single pop micro instruction, to accomplish the eight pushes to the stack 671.

During cycle 33, the first single pop micro instruction proceeds through the register stage of the microprocessor 600. It is designated POP EDI. It directs the microprocessor 600 to pop a 4-byte data entity from the stack 671 during a single access and place it in register EDI. The stack pointer indicates the top of stack is at address D4h. Because the operand targeted for register EDI is 4-bytes in width, execution of the instruction will cause the stack pointer to be incremented to indicate a new top of stack at address D8h and the operand will be retrieved from locations D7h-D4h. Also during cycle 33, a slip is inserted into the pipeline to prevent following instructions from prematurely advancing.

During cycle 34, a double pop micro instruction proceeds through the register stage of the microprocessor 600. It is designated POP2 ESI,EBP. It directs the microprocessor 600 to pop an 8-byte operand from the stack 671 in a combined access and place the first four bytes of it in register ESI and the second four bytes of it in register EBP. The stack pointer indicates the top of stack is at address D8h. Because the combined data entity targeted for registers ESI and EBP is 8-bytes in width, execution of the instruction will cause the stack pointer to be incremented to indicate a new top of stack at address E0h and the operand will be retrieved from locations DFh-D8h. Also during cycle 34, a slip is inserted into the pipeline to prevent following instructions from prematurely advancing.

During cycle 35, a double pop micro instruction proceeds through the register stage of the microprocessor 600. It is designated POP2 ESP,EBX. It directs the microprocessor 600 to pop an 8-byte operand from the stack 671 in a combined access and place the first four bytes of it in register ESP and the second four bytes of it in register EBX. The stack pointer indicates the top of stack is at address E0h. Because the combined data entity targeted for registers ESP and EBX is 8-bytes in width, execution of the instruction will cause the stack pointer to be incremented to indicate a new top of stack at address E8h and the operand will be retrieved from locations E7h-E0h. Also during cycle 35, a slip is inserted into the pipeline to prevent following instructions from prematurely advancing.

During cycle 36, a double pop micro instruction proceeds through the register stage of the microprocessor 600. It is designated POP2 EDX,ECX. It directs the microprocessor 600 to pop an 8-byte operand from the stack 671 in a combined access and place the first four bytes of it in register EDX and the second four bytes of it in register ECX. The stack pointer indicates the top of stack is at address E8h. Because the combined data entity targeted for registers EDX and ECX is 8-bytes in width, execution of the instruction will cause the stack pointer to be incremented to indicate a new top of stack at address F0h and the operand will be retrieved from locations EFh-E8h. Also during cycle 36, a slip is inserted into the pipeline to prevent following instructions from prematurely advancing.

During cycle 37, the second single pop micro instruction proceeds through the register stage of the microprocessor 600. It is designated POP EAX. It directs the microprocessor 600 to pop a 4-byte data entity from the stack 671 during a single access and place it in register EAX. The stack pointer indicates the top of stack is at address F0h. Because the operand targeted for register EAX is 4-bytes in width, execution of the instruction will cause the stack pointer to be incremented to indicate a new top of stack at address F4h and the operand will be retrieved from locations F3h-F0h. Also during cycle 37, because the second single pop micro instruction is the last micro instruction in the micro instruction sequence, a following macro instruction is allowed to proceed through the translate stage.

To accomplish a pop all macro instruction according to the present invention, under conditions where six of the eight operands can be paired together for combined accesses, the eight prescribed accesses require only five cycles of the microprocessor clock. In addition, the five distinct cache sub-lines in which the eight operands are placed are each accessed only once during the push all operation.

The previous two pop all cases, where the stack 671 is quadword aligned and where it is doubleword aligned, represent the most commonly encountered cases for a pop all instruction in an x86-compatible microprocessor. Although these two cases are most probable, sub-optimum cases may also exist. In such sub-optimum cases, one embodiment of the present invention defaults to the ordering discussed with respect to cycles 32 through 37. By doing so, execution of a pop all instruction is, nonetheless, faster than that of a present day microprocessor.

The example of FIGS. 6 and 7 illustrate that significant performance improvements can be obtained through use of the current invention. Only four instruction cycles are required to execute a push all/pop all instruction when a stack is quadword aligned. Five instruction cycles are required when the stack is doubleword aligned. Up to 50 percent savings in execution time can be achieved over the example described with reference to FIGS. 5. Hence, the problem of unnecessarily accessing a cache sub-line to access multiple operands contained therein is overcome through employment of the present invention.

Now referring to FIG. 8, a flow chart 800 is presented illustrating a method according to the present invention for performing push all/pop all operations in a pipeline microprocessor.

Flow begins at block 802 where a macro instruction is fetched from a macro instruction buffer. Flow then proceeds to decision block 804.

At decision block 804, the macro instruction is evaluated to determine if it is a 32-bit push all/pop all instruction. If not, then flow proceeds to block 806. If it is a 32-bit push all/pop all instruction, then flow proceeds to block 808.

At block 806, the macro instruction is translated into an associated sequence of micro instructions. The associated sequence of micro instructions are sequentially provided to following stages in the microprocessor pipeline for execution. Flow then proceeds to block 830.

At decision block 808, access alignment logic in the microprocessor predicts alignment of the operands prescribed for stack access by the push all/pop all macro instruction. The alignment determination is provided to an instruction decoder in the microprocessor. Flow then proceeds to decision block 810.

At decision block 810, the alignment determination is evaluated to determine if the prescribed accesses to the stack are quadword aligned. If so, then flow proceeds to block 814. If not, then flow proceeds to block 812.

At block 814, a first double push/pop micro instruction is provided directing the microprocessor to access a first pair of data entities on the stack during a combined access to the sub-line to which they are mapped. The first double push/pop micro instruction is provided to following stages in the microprocessor for execution. Flow then proceeds to block 818.

At block 818, a second double push/pop micro instruction is provided directing the microprocessor to access a second pair of data entities on the stack during a combined access to the sub-line to which they are mapped. The second double push/pop micro instruction is provided to following stages in the microprocessor for execution. Flow then proceeds to block 822.

At block 822, a third double push/pop micro instruction is provided directing the microprocessor to access a third pair of data entities on the stack during a combined access to the sub-line to which they are mapped. The third double push/pop micro instruction is provided to following stages in the microprocessor for execution. Flow then proceeds to block 826.

At block 826, a fourth double push/pop micro instruction is provided directing the microprocessor to access a fourth pair of data entities on the stack during a combined access to the sub-line to which they are mapped. The fourth double push/pop micro instruction is provided to following stages in the microprocessor for execution. Flow then proceeds to block 830.

At block 812, a first single push/pop micro instruction is provided directing the microprocessor to access a first single data entity on the stack during a single access to the sub-line to which it is mapped. The first single push/pop micro instruction is provided to following stages in the microprocessor for execution. Flow then proceeds to block 816.

At block 816, a double push/pop micro instruction is provided directing the microprocessor to access a pair of data entities on the stack during a combined access to the sub-line to which they are mapped. The double push/pop micro instruction is provided to following stages in the microprocessor for execution. Flow then proceeds to block 820.

At block 820, a double push/pop micro instruction is provided directing the microprocessor to access a pair of data entities on the stack during a combined access to the sub-line to which they are mapped. The double push/pop micro instruction is provided to following stages in the microprocessor for execution. Flow then proceeds to block 824.

At block 824, a double push/pop micro instruction is provided directing the microprocessor to access a pair of data entities on the stack during a combined access to the sub-line to which they are mapped. The double push/pop micro instruction is provided to following stages in the microprocessor for execution. Flow then proceeds to block 828.

At block 828, a second single push/pop micro instruction is provided directing the microprocessor to access a second single data entity on the stack during a single access to the sub-line to which it is mapped. The second single push/pop micro instruction is provided to following stages in the microprocessor for execution. Flow then proceeds to block 830.

At block 830, the method completes.

Although the present invention and its objects, features, and advantages have been described in detail, other embodiments are encompassed by the invention. For example, the present invention has been particularly described in terms of a 32-byte cache line having 8-byte cache sub-lines. Although the described cache architecture is representative of present day technology, such an embodiment does not restrict the applicability of the present invention. The present invention comprehends any cache line and sub-line architecture to the extent that multiple stack operands can be combined in a single access to a cache sub-line.

In addition, the present invention has been specifically characterized as providing the capability to combine two stack access operations into a single access operation by generating a double push/pop instruction, PUSH2/POP2. Current microprocessor architectures support combining two operands into a single access, primarily due to register sizes as compared to cache sub-line sizes and macro instruction buffer depth. In the future, it may be advantageous to have cache sub-line sizes much larger than what is seen today. As such, it would be possible to combine more than two stack accesses into a combined access prescribed by a PUSHX/POPX micro instruction. The present invention anticipates such improvements. The PUSHX/POPX micro instruction would direct the microprocessor to access a single cache sub-line during a single access to access more than two prescribed operands.

Furthermore, the present invention has been characterized primarily with regard to accessing stack structures via a microprocessor. It is immaterial, however, from what host platform the access is performed. Rather, it can be performed upon any platform having an execution unit that repeatedly prescribes access to adjacently located operands as described herein to include signal processors, embedded controllers, array processors, and industrial controllers.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for accessing a stack, comprising:
   an instruction buffer, configured to buffer an access all stack instruction, said access all stack instruction directing the microprocessor to access multiple operands in the stack;
   a translator, coupled to said instruction buffer, configured to receive said access all stack instruction, and to decode said access all stack instruction into an associated micro instruction sequence directing the microprocessor to access said multiple operands, wherein accesses to two of said multiple operands are grouped together into a combined access, said associated micro instruction sequence comprising:
      a plurality of double access micro instructions, one of said plurality of double access micro instructions directing the microprocessor to access said two of said multiple operands during the combined access; and
      access alignment logic, coupled to said translator, configured to indicate alignment of said two of said multiple operands for the combined access, wherein the combined access is precluded when said access alignment logic indicates that said two of said multiple operands are misaligned.

2. The microprocessor as recited in claim 1, wherein said access all stack access instruction is a pop all instruction, directing the microprocessor to retrieve said multiple operands from the stack.

3. The microprocessor as recited in claim 2, wherein said pop all instruction directs the microprocessor to retrieve eight operands from the stack.

4. The microprocessor as recited in claim 3, wherein said associated micro instruction sequence comprises:
   four double pop micro instructions, each of said double pop micro instructions directing the microprocessor to retrieve a pair of said multiple operands from the stack during a combined access.

5. The microprocessor as recited in claim 3, wherein said associated micro instruction sequence comprises:
   a first pop micro instruction, directing the microprocessor to retrieve a first operand from the stack, said first operand being one of said multiple operands;
   three double pop micro instructions, each of said double pop micro instructions directing the microprocessor to retrieve a pair of said multiple operands from the stack during a combined access; and
   a second pop micro instruction, directing the microprocessor to retrieve a second operand from the stack, said second operand being one of said multiple operands.

6. The microprocessor as recited in claim 1, wherein said access all stack access instruction is a push all instruction, directing the microprocessor to store said multiple operands on the stack.

7. The microprocessor as recited in claim 6, wherein said push all instruction directs the microprocessor to store eight operands on the stack.

8. The microprocessor as recited in claim 7, wherein said associated micro instruction sequence comprises:
   four double push micro instructions, each of said double push micro instructions directing the microprocessor to store a pair of said multiple operands on the stack during a combined access.

9. The microprocessor as recited in claim 7, wherein said associated micro instruction sequence comprises:
   a first push micro instruction, directing the microprocessor to store a first operand one the stack, said first operand being one of said multiple operands;
   three double push micro instructions, each of said double push micro instructions directing the microprocessor to store a pair of said multiple operands on the stack during a combined access; and
   a second push micro instruction, directing the microprocessor to store a second operand on the stack, said second operand being one of said multiple operands.

10. The microprocessor as recited in claim 1, wherein said two of said multiple operands are aligned if access to both requires one instruction cycle.

11. The microprocessor as recited in claim 1, wherein said two of said operands are misaligned if access to both requires more than one instruction cycle.

12. The microprocessor as recited in claim 1, wherein said access alignment logic comprises:
   a shadow stack pointer, configured to monitor a stack pointer in the microprocessor, and to indicate a top of stack associated with a macro instruction prior to execution of said macro instruction.

13. The microprocessor as recited in claim 1, wherein said translator comprises:
   a sequencer, configured to order a plurality of double access micro instructions along with zero or more access micro instructions, wherein the order reduces the number of instruction cycles required to access said multiple operands.

14. An apparatus in a microprocessor for accessing a stack, comprising:

translation logic, configured to receive a macro instruction directing the microprocessor to store/retrieve multiple operands to/from the stack, and to decode said macro instruction into an associated micro instruction sequence directing the microprocessor to access said multiple operands, wherein accesses to two of said multiple operands are grouped together into a combined access, said associated micro instruction sequence comprising:

a plurality of double access micro instructions, each of said plurality of double access micro instructions directing the microprocessor to access a pair of said multiple operands;

access alignment logic, coupled to said translation logic, configured to indicate alignment of said two of said multiple operands for the combined access; and data access logic, coupled to said translation logic, configured to receive said associated micro instruction sequence, and to accomplish the combined access;

wherein the combined access is precluded when said access alignment logic indicates that said two of said multiple operands are misaligned and the combined access is allowed when said access alignment logic indicates that said two of said multiple operands are aligned.

15. The apparatus as recited in claim 14, wherein said access all stack access instruction is a pop all instruction, directing the microprocessor to retrieve said multiple operands from the stack.

16. An apparatus in a microprocessor for accessing multiple data entities in a stack, the apparatus comprising:

a shadow stack pointer, configured to monitor a stack pointer in the microprocessor, and to indicate a top of stack associated with a macro instruction prior to execution of said macro instruction;

an instruction decoder, coupled to said shadow stack pointer, for translating a push all/pop all macro instruction into double push/pop micro instructions and single push/pop micro instructions directing the microprocessor to access the multiple data entities in the stack; and a sequencer, coupled to said instruction decoder, configured to produce an order of said double push/pop micro instructions and said single push/pop micro instructions so that grouped aligned data entities are accessed by said double push/pop micro instructions.

17. The apparatus as recited in claim 16, wherein a double push/pop micro instruction directs the microprocessor to access two of the multiple data entities during a single access.

18. The apparatus as recited in claim 16, wherein said shadow stack pointer provides said top of stack associated with successful execution of said push all/pop all macro instruction.

19. The apparatus as recited in claim 18, wherein said order, if said top of stack indicates that a combined access of a first data entity and a second data entity would result in an aligned access, comprises:

four double push/pop micro instructions, each of said double push/pop micro instructions directing the microprocessor to access two of the multiple data entities on the stack during a combined access.

20. The apparatus as recited in claim 18, wherein said order, if said top of stack indicates that a combined access of a first data entity and a second data entity would result in a misaligned access, comprises:

a first single push/pop micro instruction, directing the microprocessor to push/pop said first data entity to/from the stack;

three double push/pop micro instructions, each directing the microprocessor to access a pair of data entities on the stack during a combined access; and a second single push/pop micro instruction, directing the microprocessor to access an eighth data entity on the stack.

21. A method in a microprocessor for executing a push all instruction or a pop all instruction to access multiple stack operands, comprising:

a) reading a stack pointer to determine alignment of a pair of the multiple operands, said reading comprising:
  i) monitoring a stack pointer in the microprocessor to ascertain a current top of stack address prior to execution of the push all instruction or the pop all instruction;
  ii) estimating a new top of stack address based upon successful execution of the push all instruction or the pop all instruction; and
  iii) ascertaining alignment of a pair of the multiple operands using the new top of stack address provided by said estimating; and b) for the pair of the multiple operands which is determined to be aligned by a), combining the accesses to both operands in the pair into a single access, the single access being prescribed by a double push micro instruction or a double pop micro instruction.

* * * * *